US007944440B2

(12) United States Patent
Park

(10) Patent No.: US 7,944,440 B2
(45) Date of Patent: May 17, 2011

(54) LIQUID CRYSTAL DISPLAY DEVICE AND METHOD OF REDUCING A DISCHARGE TIME OF A LIQUID CRYSTAL CAPACITOR THEREOF

(75) Inventor: Sang-Heon Park, Asan-si (KR)

(73) Assignee: Samsung Electronics Co., Ltd. (KR)

(*) Notice: Subject to any disclaimer, the term of this patent is extended or adjusted under 35 U.S.C. 154(b) by 789 days.

(21) Appl. No.: 11/943,193

(22) Filed: Nov. 20, 2007

(65) Prior Publication Data

US 2008/0143702 A1 Jun. 19, 2008

(30) Foreign Application Priority Data

Dec. 19, 2006 (KR) ........................ 10-2006-0129826

(51) Int. Cl.
*G06F 3/038* (2006.01)
*H01J 11/04* (2006.01)

(52) U.S. Cl. ........ 345/211; 345/204; 345/214; 315/326; 315/339

(58) Field of Classification Search .................. 345/204, 345/211; 315/160–169, 326–359
See application file for complete search history.

(56) References Cited

U.S. PATENT DOCUMENTS

| | | | | |
|---|---|---|---|---|
| 5,248,963 | A * | 9/1993 | Yasui et al. | 345/98 |
| 5,793,346 | A * | 8/1998 | Moon | 345/92 |
| 6,903,734 | B2 * | 6/2005 | Eu | 345/211 |
| 7,019,725 | B1 * | 3/2006 | Lee et al. | 345/98 |
| 2001/0012005 | A1 * | 8/2001 | Choi | 345/211 |
| 2002/0080133 | A1 * | 6/2002 | Eu | 345/212 |
| 2003/0189564 | A1 * | 10/2003 | Lee et al. | 345/212 |
| 2005/0012762 | A1 * | 1/2005 | Tobita | 345/690 |
| 2006/0066550 | A1 * | 3/2006 | Huang et al. | 345/92 |
| 2006/0267906 | A1 * | 11/2006 | Shie | 345/98 |

FOREIGN PATENT DOCUMENTS

| | | |
|---|---|---|
| JP | 2003122311 | 4/2003 |
| JP | 2006047500 | 2/2006 |
| KR | 20030013273 | 2/2003 |

* cited by examiner

*Primary Examiner* — Amare Mengistu
*Assistant Examiner* — Aaron M Guertin
(74) *Attorney, Agent, or Firm* — Cantor Colburn LLP

(57) ABSTRACT

A liquid crystal display device includes: a power supply unit which outputs a supply voltage at a first level when an outside power is supplied and outputs the supply voltage at a second level when the outside power is removed; a discharge unit which outputs a discharge signal when the supply voltage at the second level is input; and a liquid crystal panel including a gate discharge line, a plurality of gate lines connected to the gate discharge line, a plurality of thin film transistors connected to the plurality of gate lines, and a plurality of liquid crystal capacitors connected to the thin film transistors and which charges to a gradation display voltage. The thin film transistor is turned on to discharge the gradation display voltage charged in the plurality of liquid crystal capacitors when the discharge signal is provided to the gate discharge line.

11 Claims, 12 Drawing Sheets

LIQUID CRYSTAL DISPLAY DEVICE AND METHOD OF REDUCING A DISCHARGE TIME OF A LIQUID CRYSTAL CAPACITOR THEREOF

This application claims priority to Korean Patent Application No. 10-2006-0129826, filed on Dec. 19, 2006, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD") device and, more particularly, to an LCD device having a reduced discharge time when an outside power is removed from the LCD device.

2. Description of the Related Art

In general, a liquid crystal display ("LCD") is a device which displays an image by adjusting light transmissivity of liquid crystal disposed between a thin film transistor ("TFT") substrate and a color filter substrate which have respective electrodes disposed on sides opposite to each other. The light transmissivity of the liquid crystal is controlled by an electric field generated by a voltage applied to the respective electrodes.

The LCD device includes a liquid crystal panel including a plurality of liquid crystal cells formed at intersections between data lines and gate lines, a data driver for applying a data signal voltage to the data line, a gate driver for applying a gate driving signal to the gate line, a timing controller for controlling the data driver and the gate driver, and a power supply unit for supplying a driving voltage to the liquid crystal panel.

The liquid crystal cell includes a liquid crystal capacitor in which a data signal voltage is charged and a TFT for applying the data signal voltage to the liquid crystal capacitor in response to a gate-on voltage. The driving voltage supplied from the power supply unit includes a supply voltage, a ground voltage, a gate-on voltage, a gate-off voltage, a common voltage and an analog supply voltage.

When an outside power supplied to the power supply unit is removed, the power supply unit outputs all output voltages including the supply voltage, the gate-on voltage, the gate-off voltage, the common voltage and the analog supply voltage at a ground voltage level, e.g., zero volts. When the ground voltage is applied to a gate of the TFT, the data signal voltage applied to the liquid crystal capacitor is discharged by a leakage current through a channel of the TFT.

As a result of the leakage current, a pattern displayed on the liquid crystal panel remains, even though the outside power supplied to the power supply unit has been removed, for an elapsed amount of time. The pattern slowly disappears due to the discharge by the leakage current through the channel of the TFT. The amount of time which elapses from when the outside power is removed until the pattern disappears is called a discharge time.

In the LCD device, the discharge time is determined by the leakage current which flows through the channel of the TFT when the ground voltage is applied to the gate of the TFT. Further, the discharge defect may occur at any time, due to a distribution of a threshold voltage of the TFT or an increase in the threshold voltage of the TFT due to a long driving time, for example.

BRIEF SUMMARY OF THE INVENTION

An exemplary embodiment of the present invention includes a liquid crystal display ("LCD") device in which a gate-on voltage is applied to a gate of a thin film transistor ("TFT") at a constant level despite a change in a threshold voltage of the TFT.

An LCD device according to an exemplary embodiment of the present invention includes: a power supply unit which outputs a supply voltage at a first level when an outside power is supplied to the power supply unit and the power supply unit outputs a supply voltage at a second level when the outside power supply is removed from the power supply unit; a discharge unit which charges a charging voltage when the supply voltage at the first level is input to the discharge unit and outputs the charged charging voltage as a discharge signal when the supply voltage at the second level is input to the discharge unit; and a liquid crystal panel including a gate discharge line, a plurality of gate lines connected to the gate discharge line, a plurality of TFTs connected to the plurality of gate lines, and a plurality of liquid crystal capacitors connected to the plurality of TFTs and which charges to a gradation display voltage. The plurality of TFTs is turned on to discharge the gradation display voltage charged in the plurality of liquid crystal capacitors when the discharge signal is provided to the gate discharge line.

The first level of the supply voltage is a level of an analog supply voltage used to generate the gradation display voltage and the second level of the supply voltage is a ground voltage.

The discharge unit includes: a first node, a second node, a first diode having an anode which receives the analog supply voltage used to generate the gradation display voltage and a cathode connected to the first node; a second diode having an anode connected to the first node and a cathode connected to the second node; a resistor having a first end connected to the first node and a second end connected to a ground terminal; a capacitor having a first end connected to the second node and a second end connected to the ground terminal; and a switching transistor having a control terminal connected to the first node, an input terminal connected to the second node and an output terminal connected to the gate discharge line of the liquid crystal panel.

The switching transistor may be a PNP-type transistor.

The gate discharge line includes a plurality of first diodes each having a cathode connected to a respective gate line gate line of the plurality of gate lines and an anode connected to the gate discharge line, and a plurality of second diodes each having a cathode connected to the gate discharge line and an anode connected to a respective gate line of the plurality of gate lines.

The gate discharge line includes a plurality of diodes each having an anode connected to a respective gate line of the plurality of gate lines and a cathode connected to the gate discharge line.

In an alternative exemplary embodiment, the first level of the supply voltage is a level of a gate-on voltage applied to the plurality of gate lines and the second level of the supply voltage is the ground voltage.

In another exemplary embodiment of the present invention, an LCD device includes: a power supply unit which outputs an analog supply voltage at a first level when an outside power is supplied and outputs the analog supply voltage at a second level when the outside power is removed from the power supply unit; a gamma voltage generating unit which divides the analog supply voltage at the first level to generate a gamma voltage; a data driving unit which generates a gradation display voltage using the gamma voltage; a discharge unit which charges a charging voltage when the analog supply voltage at the first level is input to the discharge unit and outputs the charged charging voltage as a discharge signal when the analog supply voltage at the second level is input to the discharge unit; and a liquid crystal panel including a gate discharge line, a plurality of gate lines connected to the gate discharge line, a plurality of TFTs connected to the plurality of gate lines, and a plurality of liquid crystal capacitors connected to the TFTs and which charges to the gradation display voltage.

The discharge unit includes: a first node, a second node, a first diode having an anode which receives the analog supply voltage and a cathode connected to the first node; a second diode having an anode connected to the first node and a cathode connected to the second node; a resistor having a first end connected to the first node and a second end connected to a ground terminal; a capacitor having a first end connected to the second node and a second end connected to the ground terminal; and a switching transistor having a control terminal connected to the first node, an input terminal connected to the second node and an output terminal connected to the gate discharge line of the liquid crystal panel.

The switching transistor may be a PNP-type transistor.

In yet another exemplary embodiment of the present invention, a method of reducing a discharge time of a liquid crystal capacitor of a liquid crystal display device includes: outputting a supply voltage at a first level when an outside power is supplied to a power supply unit and outputting the supply voltage at a second level when the outside power is removed from the power supply unit; charging a charging voltage when the supply voltage at the first level is input to a discharge unit and outputting the charged charging voltage as a discharge signal when the supply voltage at the second level is input to the discharge unit; connecting a plurality of liquid crystal capacitors of the liquid crystal display device to a plurality of thin film transistors of the liquid crystal display device; charging the plurality of liquid crystal capacitors of the liquid crystal display device to a gradation display voltage; and turning the plurality of thin film transistors of the liquid crystal display device on to discharge the gradation display voltage charged in the plurality of liquid crystal capacitors of the liquid crystal display device when the discharge signal is provided to a gate discharge line of the liquid crystal display device.

The first level of the supply voltage is a level of an analog supply voltage used to generate the gradation display voltage and the second level of the supply voltage is a ground voltage.

In an alternative exemplary embodiment, the first level of the supply voltage is a level of a gate-on voltage applied to a plurality of gate lines of the liquid crystal display device and the second level of the second supply voltage is a ground voltage.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
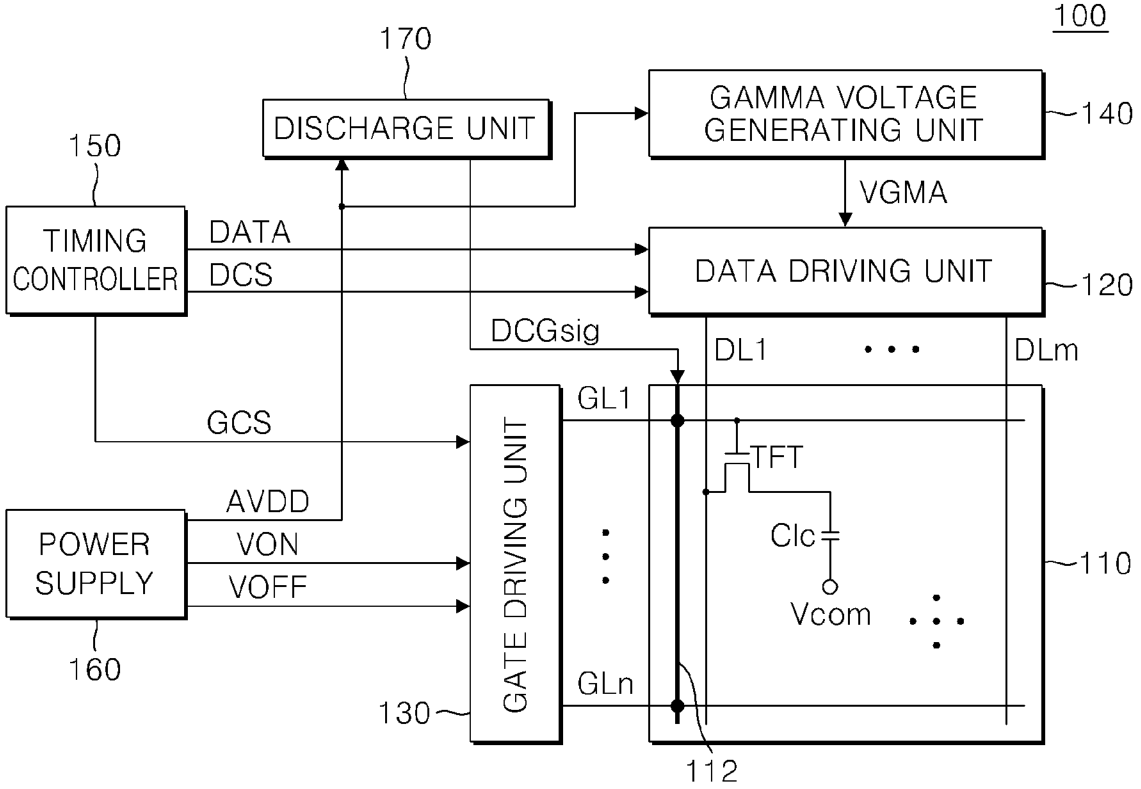
FIG. 1 is a block diagram of an LCD device according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being “on” another element, it can be directly on the other element or intervening elements may be present therebetween. In contrast, when an element is referred to as being “directly on” another element, there are no intervening elements present. As used herein, the term “and/or” includes any and all combinations of one or more of the associated listed items.

It will be understood that although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” or “includes” and/or “including,” when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

The present invention will now be described in further detail with reference to the accompanying drawings.

FIG. 1 is a block diagram of a liquid crystal display ("LCD") device according to an exemplary embodiment of the present invention. As shown in FIG. 1, the LCD device 100 includes a liquid crystal panel 110, a data driving unit 120, a gate driving unit 130, a gamma voltage generating unit 140, a timing controller 150, a power supply unit 160 and a discharge unit 170.

The liquid crystal panel 110 includes an upper substrate (not shown), a lower substrate (not shown) and a liquid crystal layer (not shown) interposed therebetween. A color filter (not shown) and a common electrode (not shown) are formed on the upper substrate and a thin film transistor ("TFT") is formed on the lower substrate. The lower substrate includes a liquid crystal capacitor Clc in which a gradation display voltage is charged when the TFT which applies the gradation display voltage to the liquid crystal capacitor Clc in response to a gate-on voltage VON. The liquid crystal capacitor Clc and the TFT are formed at intersections between respective gate lines of a plurality of gate lines GL1 through GLn and respective data lines of a plurality of data lines DL1 through DLm. More specifically, the TFT shown in FIG. 1, for example, has a gate connected to the gate line GL1, a source connected to the data line DL1, and a drain connected to a pixel electrode of the liquid crystal capacitor Clc.

The liquid crystal panel 110 further includes a gate discharge line 112 connected to the plurality of gate lines GL1 through GLn, as shown in FIG. 1. A discharge signal DCGsig supplied from the discharge unit 170 is applied to the gate discharge line 112. As discussed below in further detail, the discharge signal DCGsig is used to simultaneously turning on TFTs connected to the plurality of gate lines GL1 through GLn to discharge the gradation display voltages charged in the liquid crystal capacitors Clc when an outside power (not shown) supplied to the power supply 160 is removed.

The data driving unit 120 generates the gradation display voltage corresponding to a data signal DATA output from the timing controller 150 using a gamma voltage VGMA output from the gamma voltage generating unit 140 and applies the gradation display voltage to the TFT driven by the gate-on voltage VON to display an image on the LCD device 100.

Furthermore, the data driving unit 120 receives a data control signal DCS and the data signal DATA from the timing controller 150 and a gamma voltage VGMA from the gamma voltage generating unit 140. In one exemplary embodiment of the present invention, the gradation display voltage is an analog voltage corresponding to the data signal DATA, and the data control signal DCS includes a data start pulse STH (not shown) and a data synchronization clock signal CPH (not shown).

The data driving unit 120, including a data driving integrated circuit ("IC") (not shown), may be attached to the liquid crystal panel 110 in the form of a tape carrier package ("TCP") or directly mounted on a non-display region of the liquid crystal panel 110 in the form of a chip on glass ("COG"), for example, but is not limited thereto in alternative exemplary embodiments of the present invention.

The gate driving unit 130 sequentially applies the gate-on voltage VON to respective gate lines of the plurality of gate lines GL1 through GLn and applies a gate-off voltage VOFF to respective gate lines of the plurality of gate lines GL1 through GLn to which the gate-on voltage VON is not applied. Therefore, the gate driving unit 130 simultaneously turns on a plurality of TFTs connected to sequentially selected respective gate lines of the plurality of gate lines GL1 through GLn.

The gate driving unit 130 receives a gate control signal GCS from the timing controller 150, and the gate-on voltage VON and the gate-off voltage VOFF from the power supply unit 160. In one exemplary embodiment of the present invention, the gate control signal GCS includes a gate start pulse STV (not shown) and a gate synchronization clock CPV (not shown), but is not limited thereto.

The gate driving unit 130, including a gate driving IC, may be attached to the liquid crystal panel 110 in the form of a TCP, or may be disposed integrally into a non-display region of the liquid crystal panel 110 in the form of an amorphous silicon gate ("ASG") during a process of forming the plurality of TFTs.

The gamma voltage generating unit 140 divides an analog supply voltage AVDD supplied from the power supply unit 160 to generate the gamma voltage VGMA and provides the gamma voltage VGMA to the data driving unit 120.

The timing controller 150 converts an outside data signal (not shown) into the data signal DATA and supplies the data signal DATA to the data driving unit 120. Further, the timing controller 150 generates the gate control signal GCS and the data control signal DCS, and supplies the gate control signal GCS and the data control signal DCS to the gate driving unit 130 and the data driving unit 120, respectively.

The power supply unit 160 receives an outside supply voltage VDD (not shown) to generate the gate-on voltage VON and the gate-off voltage VOFF and provides the gate-on voltage VON and the gate-off voltage VOFF to the gate driving unit 130. Moreover, the power supply unit 160 generates the analog supply voltage AVDD and provides the analog supply voltage AVDD to the gamma voltage generating unit 140 and the discharge unit 170.

When the outside supply voltage VDD (not shown) is not applied to the power supply unit 160, the power supply unit 160 outputs all output voltages including the gate-on voltage VON, the gate-off voltage VOFF, the common voltage VCOM and the analog supply voltage AVDD at a ground voltage VSS (not shown) level. In one exemplary embodiment, the ground voltage VSS has a voltage level of zero volts, but is not limited thereto in alternative exemplary embodiments.

As described in further detail later, the analog supply voltage AVDD supplied from the power supply unit 160 charges the discharge unit 170 to a charging voltage and when the outside supply voltage VDD is removed from the power supply 160, the analog supply voltage AVDD drops to the ground voltage VSS and the discharge unit 170 generates the discharge signal DCGsig at the charging voltage and provides the discharge signal DCGsig at the charging voltage to the gate discharge line 112 of the liquid crystal panel 110. Thus, when the outside supply voltage VDD is removed to the power supply 160, each TFT of the plurality of TFTs electrically connected to the gate discharge line 112 is turned on in response to the discharge signal DCGsig at the charging voltage output from the discharge unit 170 and the gradation display voltages charged in the liquid crystal capacitors Clc are discharged through the data lines DL1 through DLm more rapidly than gradation display voltages are discharged in an LCD device of the prior art, as described in further detail later.

In one exemplary embodiment of the present invention, a level of the charging voltage of the discharge signal DCGsig is substantially the same as a level of the analog supply voltage AVDD, but is not limited thereto in alternative exemplary embodiments.

Figure 2:
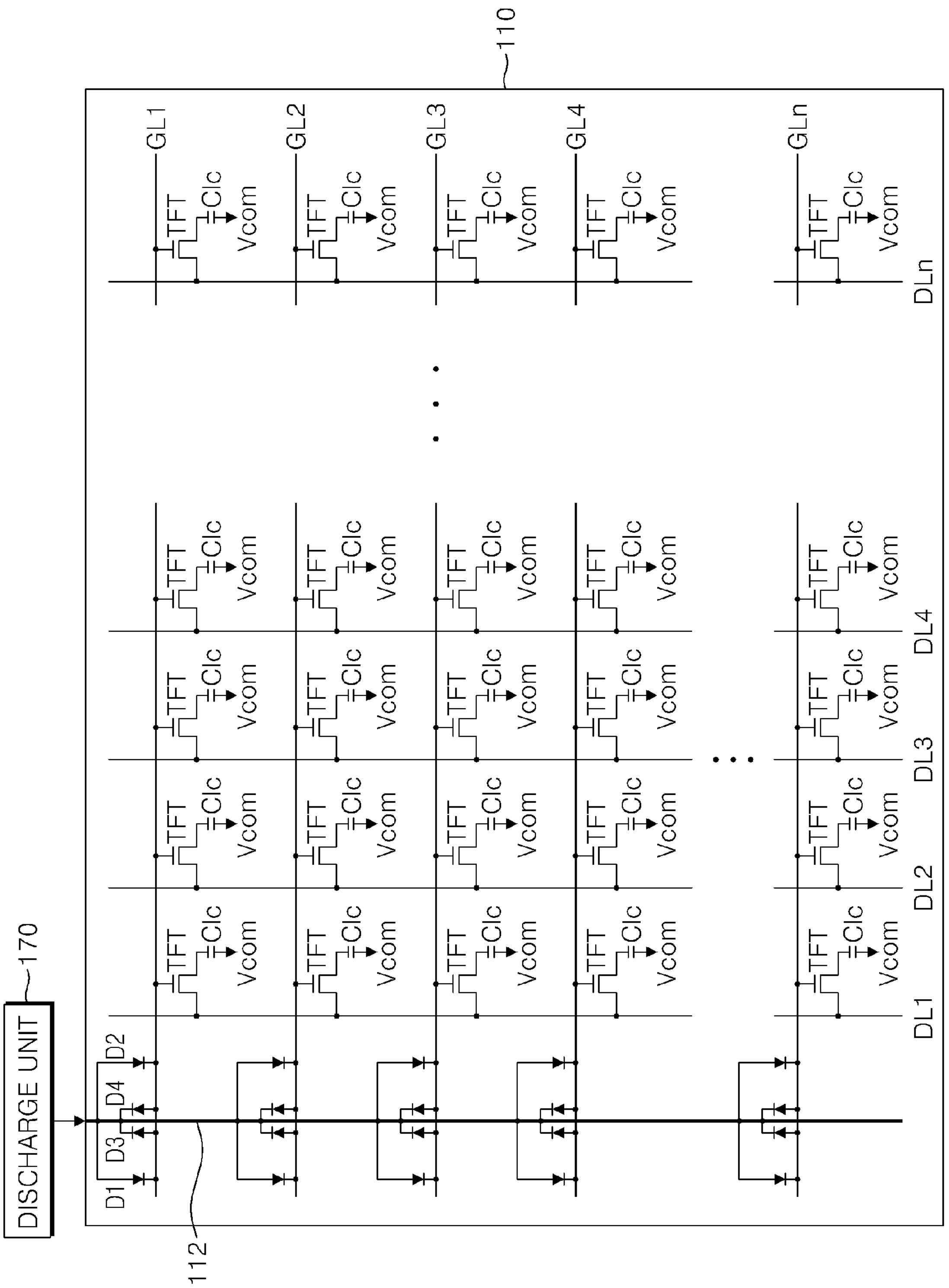
FIG. 2 is a schematic circuit diagram which shows a gate discharge line of the liquid crystal panel of the LCD device according to the exemplary embodiment of the present invention in FIG. 1.

FIG. 2 is a schematic circuit diagram which shows a gate discharge line connected to the discharge unit 170 of the liquid crystal panel of the LCD device according to the exemplary embodiment of the present invention in FIG. 1. As shown in FIG. 2, the gate discharge line 112 according to one exemplary embodiment of the present invention is an electrostatic diode line for discharging static electricity, but is not limited thereto in alternative exemplary embodiments.

More specifically, the gate discharge line 112 includes a plurality of diode D1 and a plurality of diodes D2, each diode of which has a cathode connected to the gate lines GL1 through GLn and an anode connected to the gate discharge line 112. The gate discharge line 112 further includes a plurality of diode D3 and a plurality of diodes D4, each diode of which has an anode connected to the gate lines GL1 through GLn and a cathode connected to the gate discharge line 112.

When the discharge signal DCGsig at the charging voltage is applied from the discharge unit 170 to the gate discharge line 112, the diodes D1 and D2 are each turned on to supply a voltage at the charging voltage to the plurality of gate lines GL1 through GLn.

As a result, each TFT of the plurality of TFTs, each of which has a gate connected to a respective gate line of the plurality of gate lines GL1 through GLn, is simultaneously turned on, thereby discharging the gradation display voltages charged in the liquid crystal capacitors Clc through the data lines DL1 through DLm more rapidly than in an LCD device of the prior art.

Figure 3:
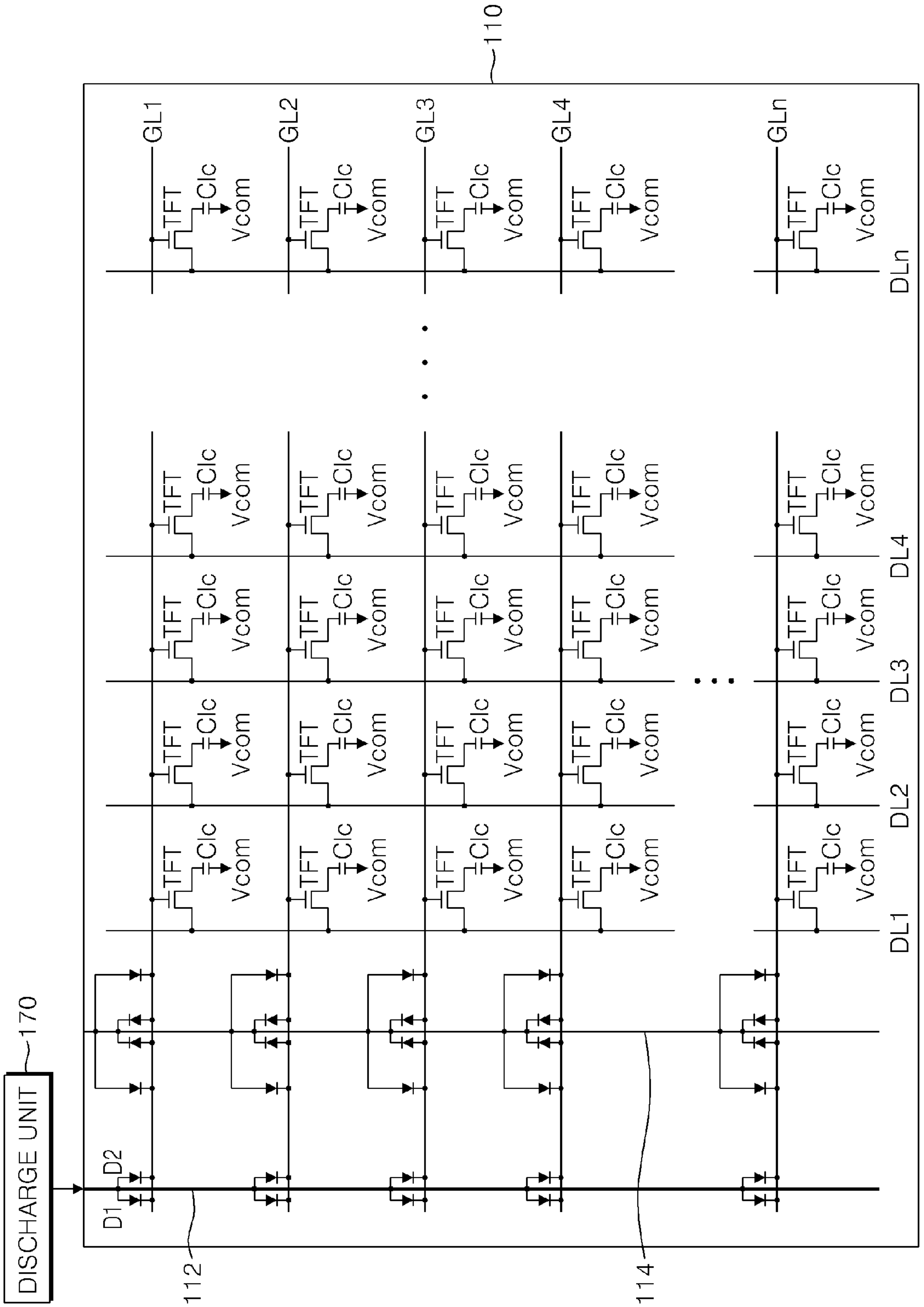
FIG. 3 is a schematic circuit diagram which illustrates an alternative exemplary embodiment of a gate discharge line of the liquid crystal panel of the LCD device according to the exemplary embodiment of the present invention in FIG. 1.

FIG. 3 is a schematic circuit diagram which shows an alternative exemplary embodiment of a gate discharge line connected to the discharge unit of the liquid crystal panel of the LCD device according to the exemplary embodiment of the present invention in FIG. 1. As shown in FIG. 3, a gate discharge line 112 according to an alternative exemplary embodiment of the present invention is disposed adjacent to an electrostatic diode line 114. The electrostatic diode line in the alternative exemplary embodiment shown in FIG. 3 is substantially the same as the electrostatic diode line described above in reference to the exemplary embodiment of the present in invention shown in FIG. 2, and any repetitive description thereof will hereinafter be omitted.

Referring to FIG. 3, the gate discharge line 112 includes a plurality of diodes D1 and a plurality of diodes D2, each diode of which has a cathode connected to the gate lines GL1 through GLn and an anode connected to the gate discharge line 112.

Thus, in a similar manner as described above in reference to FIG. 2, when the discharge signal DCGsig at the charging voltage is applied from the discharge unit 170 to the gate discharge line 112, the diodes D1 and D2 are turned on to supply the discharge signal DCGsig at the charging voltage to the plurality of gate lines GL1 through GLn.

As a result, each TFT of the plurality of TFTs, each of which has a gate connected to a respective gate line of the plurality of gate lines GL1 through GLn is simultaneously turned on, thereby discharging the gradation display voltages charged in the liquid crystal capacitors Clc through the data lines DL1 through DLm more rapidly than in an LCD device of the prior art.

Figure 4:
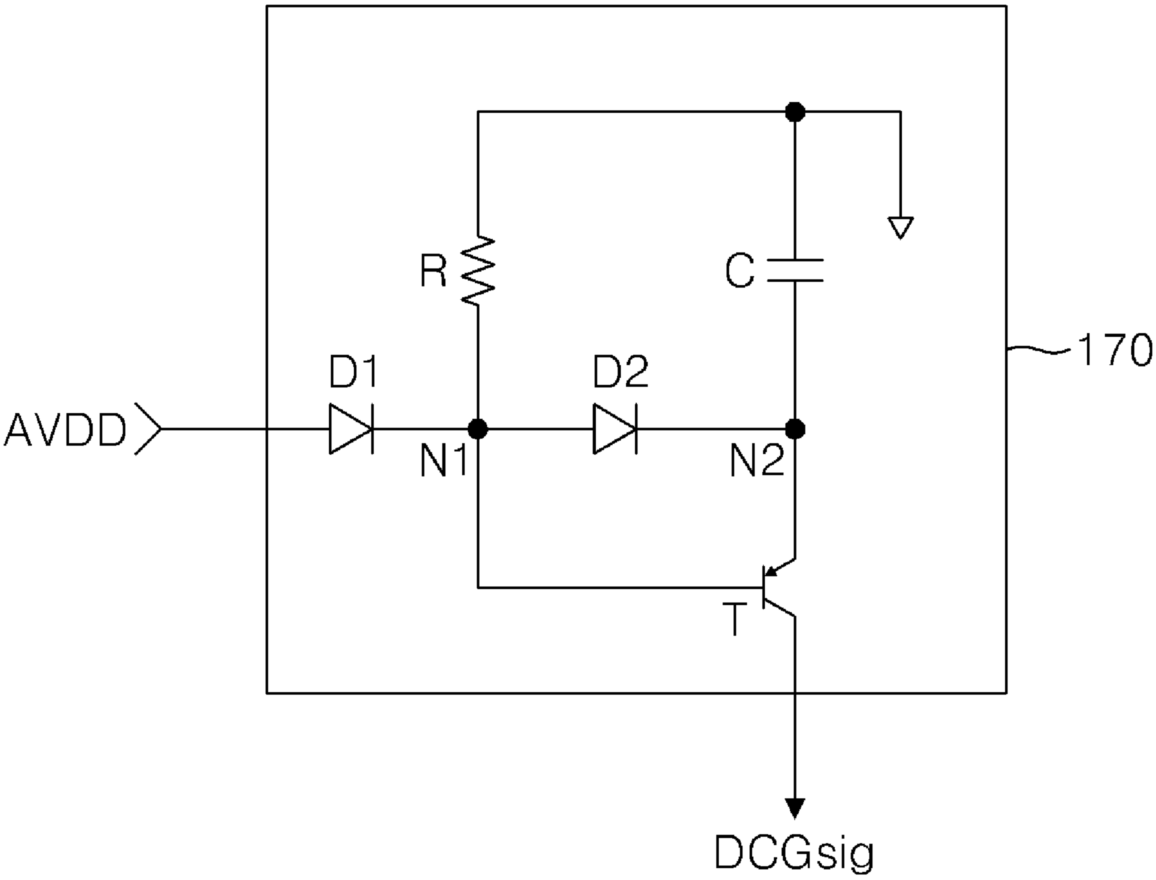
FIG. 4 is a schematic circuit diagram illustrating a discharge unit of the LCD device according to the exemplary embodiment of the present invention in FIG. 1.

FIG. 4 is a schematic circuit diagram illustrating a discharge unit of the LCD device according to the exemplary embodiment of the present invention in FIG. 1. As shown in FIG. 4, the discharge unit 170 comprises first and second diodes D1 and D2, respectively, a resistor R, a capacitor C and a transistor T.

The first diode D1 and the second diode D2 are connected in electrical series with each other, as shown in FIG. 4. More specifically, the first diode D1 has an anode to which the analog supply voltage AVDD is applied and a cathode connected to a first node N1. The second diode D2 has an anode connected to the first node N1 and a cathode connected to a second node N2.

The resistor R has a first end connected to the first node N1 and a second end connected to a ground terminal. The capacitor C has a first end connected to the second node N2 and a second end connected to the ground terminal. In an exemplary embodiment, the transistor T is a PNP-type transistor, but is not limited thereto. Further, the transistor T has a base connected to the first node N1, an emitter connected to the second node N2 and a collector which outputs the discharge signal DCGsig. The transistor T shown in FIG. 4 is a bipolar junction transistor ("BJT"), but in alternative exemplary embodiments the transistor T may be a metal oxide silicon ("MOS") transistor, for example, but is not limited thereto.

Operation of the discharge unit 170 will be described in further detail below with reference to FIG. 4.

Operation of the discharge unit in a first case in which an outside supply voltage VDD is supplied to the power supply 160 (FIG. 1) will be described first. For purposes of discussion of the first case, the analog supply voltage AVDD supplied to the discharge unit 170 from the power supply 160 has a voltage at a constant level of 8 volts, but is not limited thereto in alternative exemplary embodiments.

When the analog supply voltage AVDD of 8 volts is applied to the discharge unit 170, a current flows through the first and second diodes D1 and D2, respectively, and a voltage at the second node N2 is thereby increased. Further, a charging voltage at the second node N2, e.g., a voltage difference between the second node N2 and the ground terminal, is charged in the capacitor C of the discharge unit 170. When the resistor R has a high resistance, a very small amount of current, e.g., substantially no current, flows through the resistor R, and a voltage at the first node N1 correspond to about 8 volts, while the charging voltage at the second node N2 charged in the capacitor C is slightly less than the voltage at the first node N1, e.g., about 8 volts, due to a forward voltage drop of the diode D2.

In an exemplary embodiment, the resistor R has a resistance of more than 1 MΩ, but is not limited thereto.

Further referring to FIG. 4, the voltage at the first node N1 is applied to the base of the transistor T connected to the first node N1, e.g., about 8 volts, is applied to the base of the transistor T, while the voltage at the second node N2, e.g., slightly less than 8 volts, is applied to the emitter of the transistor T, thus turning off the transistor T, since a base-emitter voltage of the transistor T is below a threshold voltage for the transistor T.

Next, operation of the discharge unit 170 in a second case in which the outside supply voltage VDD supplied to the power supply 160 (FIG. 1) is removed will be described. When the outside supply voltage VDD supplied to the power supply 160 (FIG. 1) is removed, the analog supply voltage AVDD has a voltage at a ground voltage level, e.g., zero volts, but is not limited thereto in alternative exemplary embodiments.

When the analog supply voltage AVDD of zero volts is applied to the discharge unit 170, the charging voltage at the second node N2 charged in the capacitor C is applied to the emitter of the transistor T and reverse biases the first and second diodes D1 and D2, respectively, thereby turning off the first and second diodes D1 and D2, respectively. As a result, no current flows through the first diode D1 or the second diode D2 of the discharge unit 170.

Although no current flows through the first and second diodes D1 and D2, respectively, the charging voltage of the capacitor C causes a current to flow to the base of the transistor T through the resistor R. The current which flows to the base of the transistor T through the resistor R is a small current due to the resistor R having a high resistance, as described above. Therefore, a voltage at the base of the transistor T is small, e.g., slightly greater than zero volts, due to the small current which flows to the base of the transistor T through the resistor R.

More specifically, a voltage slightly greater than zero volts, e.g., substantially less than about 8 volts, is applied to the base of the transistor T while the charging voltage charged in the capacitor C, e.g., a voltage which is a little lower than about 8 volts, as described in greater detail above, is applied to the emitter of the transistor T, increasing the base-emitter voltage of the transistor T to above the threshold voltage of the transistor T and thereby turning the transistor T on. As a result, the charging voltage charged in the capacitor C is applied to the gate discharge line 112 of the liquid crystal panel as the discharge signal DCGsig (FIGS. 2 and 3).

Figure 5:
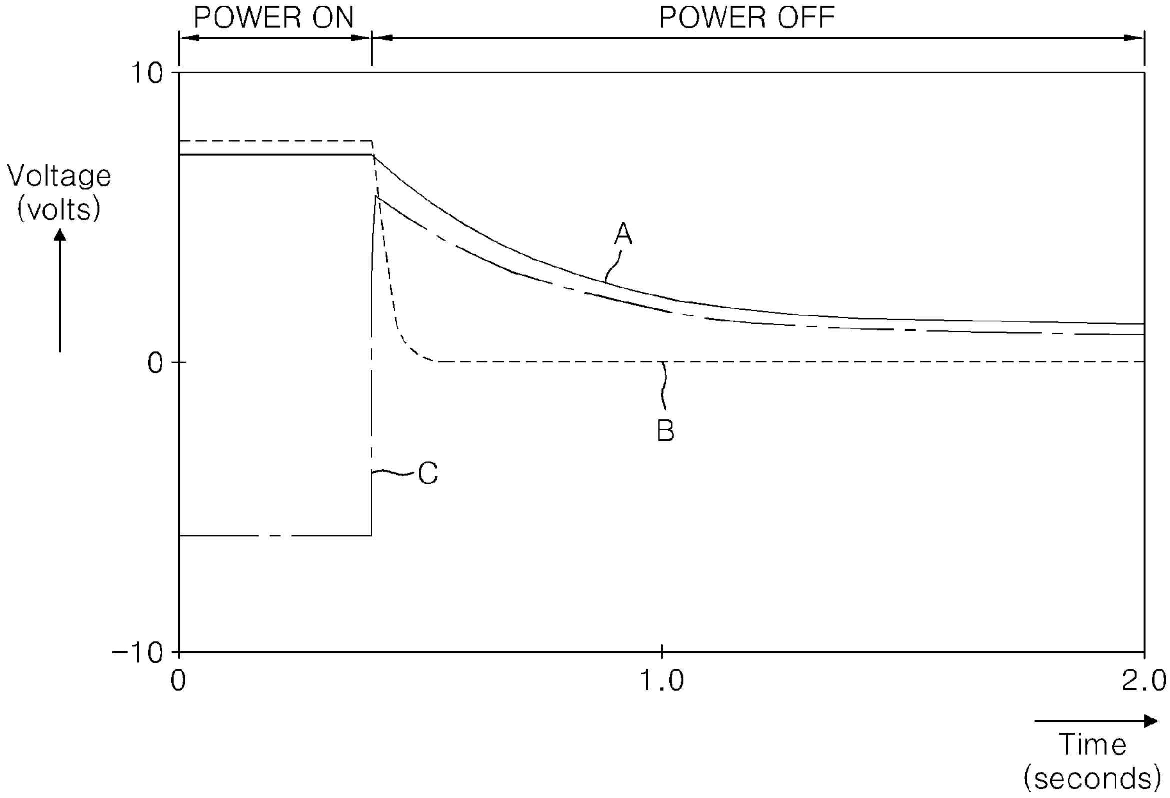
FIG. 5 is a graph of voltage versus time illustrating an operation of the LCD device according to the exemplary embodiment of the present invention in FIG. 1.

FIG. 5 is a graph of voltage versus time illustrating an operation of the LCD device according to the exemplary embodiment of the present invention in FIG. 1. The graph shown in FIG. 5 corresponds to the resistor R of the discharge unit 170 (FIG. 4) having a resistance of 1 MΩ and the capacitor C of the discharge unit 170 having a capacitance of 40 μF. Further, in FIG. 5, curve A represents a charging voltage charged in the capacitor C of the discharge unit 170, curve B represents a voltage charged in the liquid crystal capacitor Clc and curve C represents a voltage applied to the plurality of gate lines GL1 through GLn.

During a power on period when an outside supply voltage VDD is supplied to the power supply 160 (FIG. 1), e.g., the operation of the discharge unit 170 in the first case described above with respect to FIG. 4, an analog supply voltage AVDD of 8 volts, for example, but not being limited thereto, is charged in the capacitor C as a charging voltage of the discharge unit 170, and a gate-off voltage VOFF of −6 volts, for example, but not being limited thereto, is applied to the plurality of gate lines GL1 through GLn. As a result, the TFTs of the plurality of TFTs of the liquid crystal panel 110 (FIGS. 1-3) maintain an off-state, and the gradation display voltages charged in the liquid crystal capacitors Clc are not discharged.

During a power off period when the outside supply voltage VDD supplied to the power supply 160 (FIG. 1) is removed from the power supply 160, e.g., the operation of the discharge unit 170 in the second case described in greater detail above with respect to FIG. 4, the capacitor C of the discharge unit 170 supplies the charging voltage of approximately 8 volts to the plurality of gate lines GL1 through GLn as a discharge signal DCGsig, and the discharge signal DCGsig of approximately 8 volts is applied to each of the gate lines GL1 through GLn of the liquid crystal panel 110. As a result, the TFTs connected to respective gate lines GL1 through GLn are simultaneously turned on and the gradation display voltages charged in the liquid crystal capacitors Clc are discharged within a short time, e.g., about 0.5 seconds, as shown in FIG. 5, through the data lines DL1 through DLm.

Thus, an LCD device according to an exemplary embodiment of the present invention has a structure in which a charging voltage is applied to gates of TFTs to discharge gradation display voltages of liquid crystal capacitors when an outside power is removed, as opposed to an LCD of the prior art in which a ground voltage is applied to the gates of the TFTs to discharge the gradation display voltages of the liquid crystal capacitors using a leakage current of the channel of the TFT. Accordingly, a discharge time of the LCD device according to an exemplary embodiment of the present invention is substantially reduced.

Figure 6:
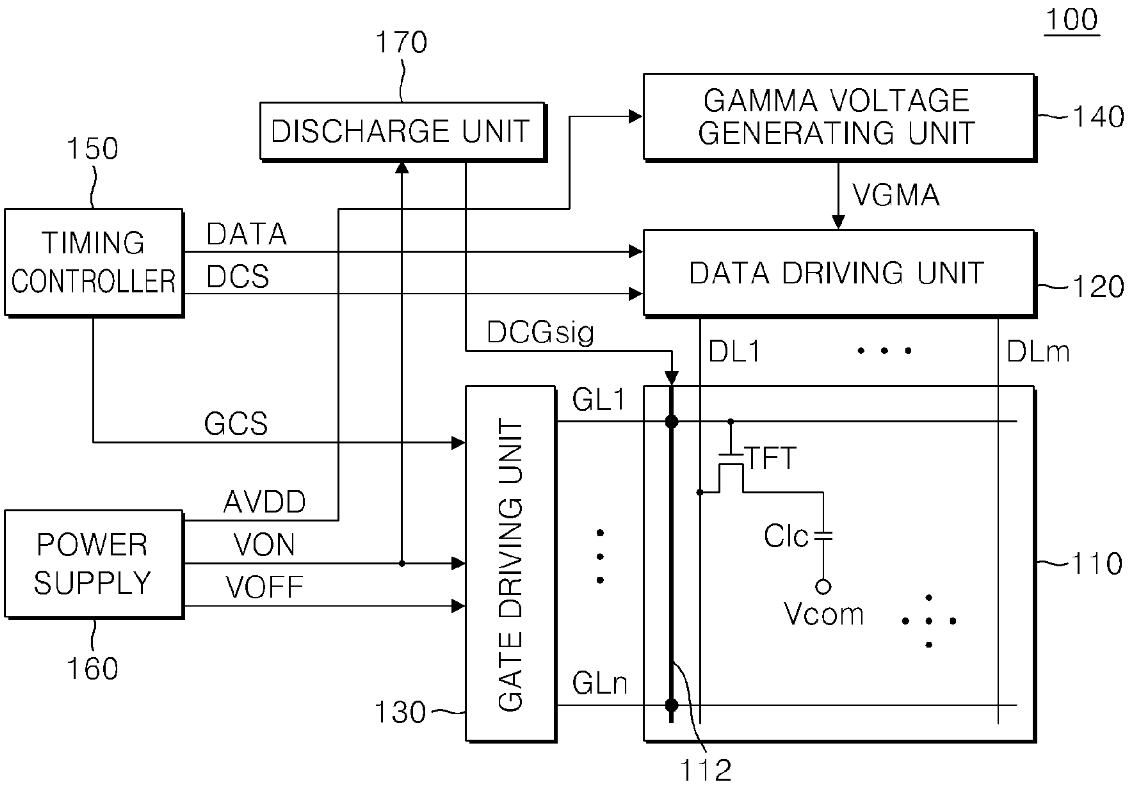
FIG. 6 is a block diagram of an LCD device according to an alternative exemplary embodiment of the present invention.

FIG. 6 is a block diagram of an LCD device according to an alternative exemplary embodiment of the present invention. An LCD device 100 as shown in FIG. 6 has a configuration in which a discharge unit 170 is supplied with a gate-on voltage VON from a power supply unit 160.

Since the configuration and the operation of a liquid crystal panel 110, a data driving unit 120, a gate driving unit 130, a gamma voltage generating unit 140, a timing controller 150, the power supply unit 160 and the discharge unit 170 in FIG. 6 are substantially the same as those described in greater detail above with reference to FIGS. 1 through 4, repetitive descriptions thereof have been omitted below.

Figure 7:
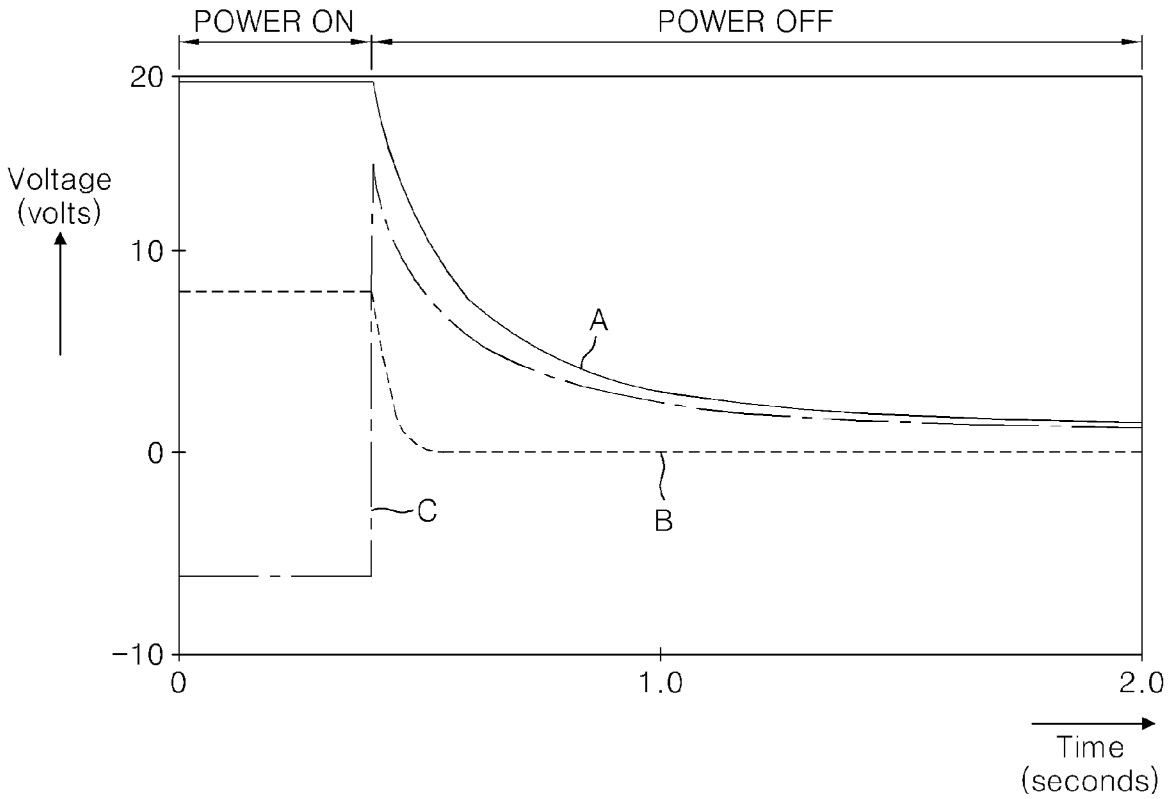
FIG. 7 is a graph of voltage versus time illustrating an operation of the LCD device according to the alternative exemplary embodiment of the present invention in FIG. 6.

FIG. 7 is a graph of voltage versus time illustrating an operation of the LCD device according to the alternative exemplary embodiment of the present invention in FIG. 6, in which a resistor R of the discharge unit 170 has a resistance of 1 MΩ and a capacitor C of the discharge unit 170 has a capacitance of 40 μF. In FIG. 7, curve A represents a charging voltage charged in the capacitor C of the discharge unit 170, curve B represents a voltage charged in the liquid crystal capacitor Clc and curve C represents a voltage applied to the gate lines GL1 through GLn.

During a power on period when an outside supply voltage VDD is supplied to the power supply 160 (FIG. 6), e.g., the operation of the discharge unit 170 in the first case described in greater detail above with respect to the exemplary embodiment of the present invention in FIG. 4, a gate-on voltage of about 20 volts, for example, but is not limited thereto, is charged in the capacitor C of the discharge unit 170 as a charging voltage, and a gate-off voltage VOFF of about −6 volts, for example, but is not limited thereto, is applied to a plurality of gate lines GL1 through GLn. As a result, a plurality of TFTs maintains an off-state, and a gradation display voltage charged in a liquid crystal capacitor Clc is not discharged.

During a power off period when the outside supply voltage VDD supplied to the power supply 160 (FIG. 6) is removed from the power supply 160, e.g., the operation of the discharge unit 170 in the second case described above in greater detail with respect to the exemplary embodiment in FIG. 4, the capacitor C of the discharge unit 170 supplies the charging voltage of approximately 20 volts to the plurality of gate lines GL1 through GLn as a discharge signal DCGsig, and the discharge signal DCGsig of approximately 20 volts is applied to the plurality of gate lines GL1 through GLn of the liquid crystal panel 110. As a result, each TFT of the plurality of TFTs connected to the plurality of gate lines GL1 through GLn is simultaneously turned on and the gradation display voltages charged in the liquid crystal capacitors Clc are discharged within a short time, e.g., about 0.5 seconds, as shown in FIG. 7, through a plurality of data lines DL1 through DLm.

Figure 8:
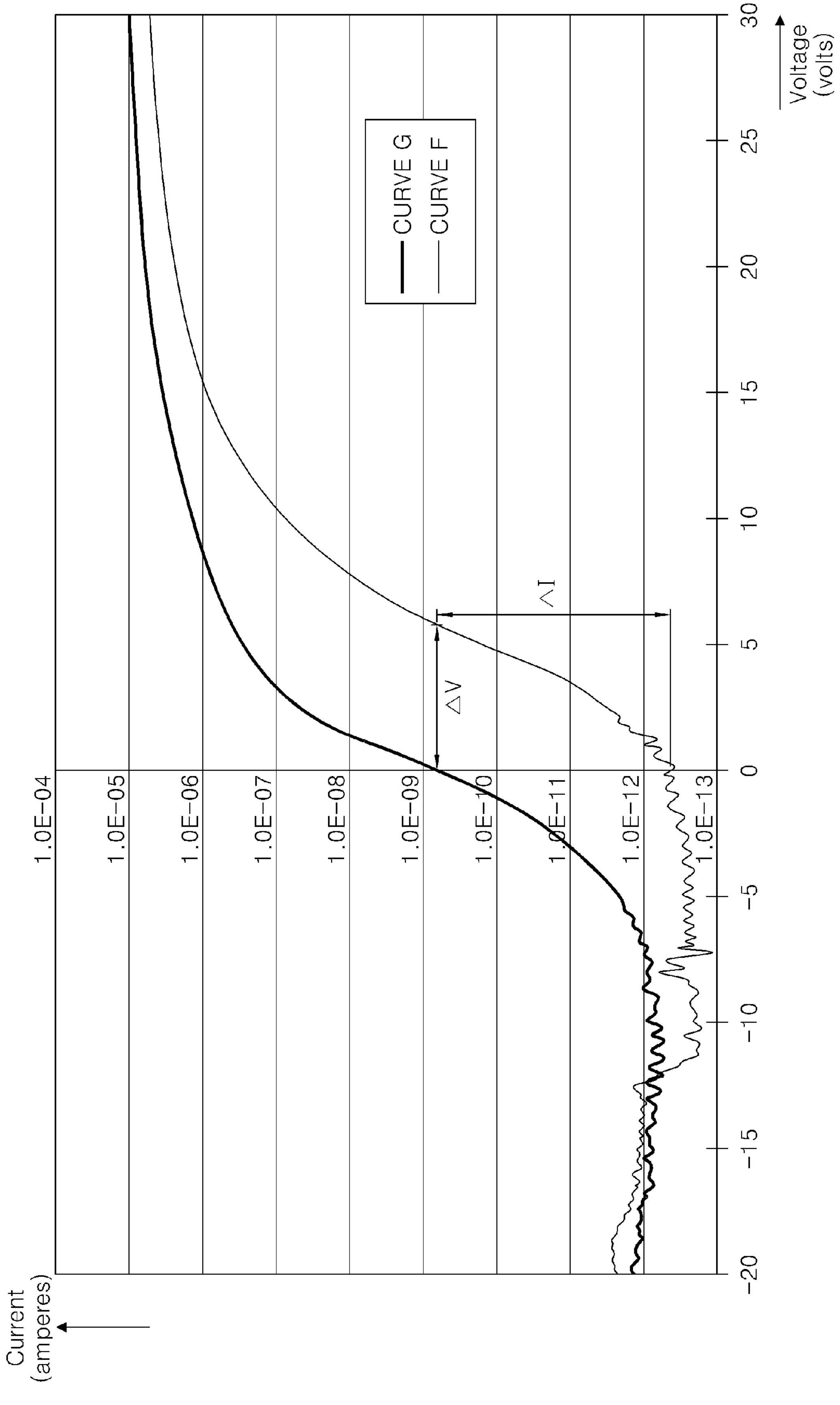
FIG. 8 is a graph of current versus voltage illustrating TFT channel discharge currents for input voltages to a discharge unit of the LCD according to the exemplary embodiment of the present invention in of FIG. 4.

FIG. 8 is a graph of current versus voltage illustrating TFT channel discharge currents for input voltages to the discharge unit, e.g., substantially a voltage applied to a gate of a TFT of a liquid crystal panel according to the exemplary embodiment of the present invention in FIGS. 1 and 4. Further, FIG. 8 illustrates a change in a discharge current which flows through a channel of a TFT having a normal discharge characteristic (curve G) and a TFT having a degraded discharge characteristic (curve F) for given voltages applied to the gate of the respective normal discharge characteristic TFT or degraded discharge characteristic TFT. More specifically, a discharge characteristic curve of a TFT shifts to the right (e.g., shifts from curve G to curve F in FIG. 8) due to a schedule variance in a threshold voltage of the TFT and/or an increase in the threshold voltage of the TFT due to a long driving time or differences in a threshold voltage of a TFT which is turned on and a threshold voltage of the same TFT when it is turned off, for example, as described above.

Referring to curve G of FIG. 8, when a voltage of zero volts is applied to the gate of the TFT, in the case of the TFT having a good discharge characteristic (curve G of FIG. 4), a leakage current, measured in nanoamperes, flows and thereby a relatively short time, e.g., about 3 seconds to about 4 seconds, is needed to discharge the gradation display voltages of the liquid crystal capacitors. In contrast, in the case of the TFT having a degraded discharge characteristic, a relatively weak leakage current, measured in picoamperes, flows and thereby a relatively long time, e.g., about 50 seconds, is needed to discharge the gradation display voltages of the liquid crystal capacitors.

Thus, as shown in FIG. 8, when zero volts is applied to the respective gates of the TFT having normal discharge characteristics (curve G) and degraded discharge characteristics (curve F), a current difference ΔI between curves G and F corresponds to a voltage difference ΔV of about 5 volts, as shown in FIG. 8.

Accordingly, the LCD device according to exemplary embodiments of the present invention uses known characteristics, e.g., the voltage difference ΔV of about 5 volts, to provide a discharge signal DCGsig having a constant voltage level to the gate of the TFT, thus compensating for the change in the leakage current for the reasons discussed above.

Therefore, the LCD device according to exemplary embodiments of the present invention applies a discharge signal having a voltage of about 5 volts higher than a voltage applied to a gate line of an LCD device of the prior art, for example, but is not limited thereto, to the gate line of the LCD of the present invention when an outside supply voltage VDD is off, thereby maintaining a desirable discharge quality characteristic of the TFT. In one exemplary embodiment, the discharge unit is supplied with the analog supply voltage AVDD of about 8 volts or, alternatively, the gate-on voltage VON of about 20 volts as an input voltage as the discharge signal DCGsig, but is not limited thereto.

Figure 9A:
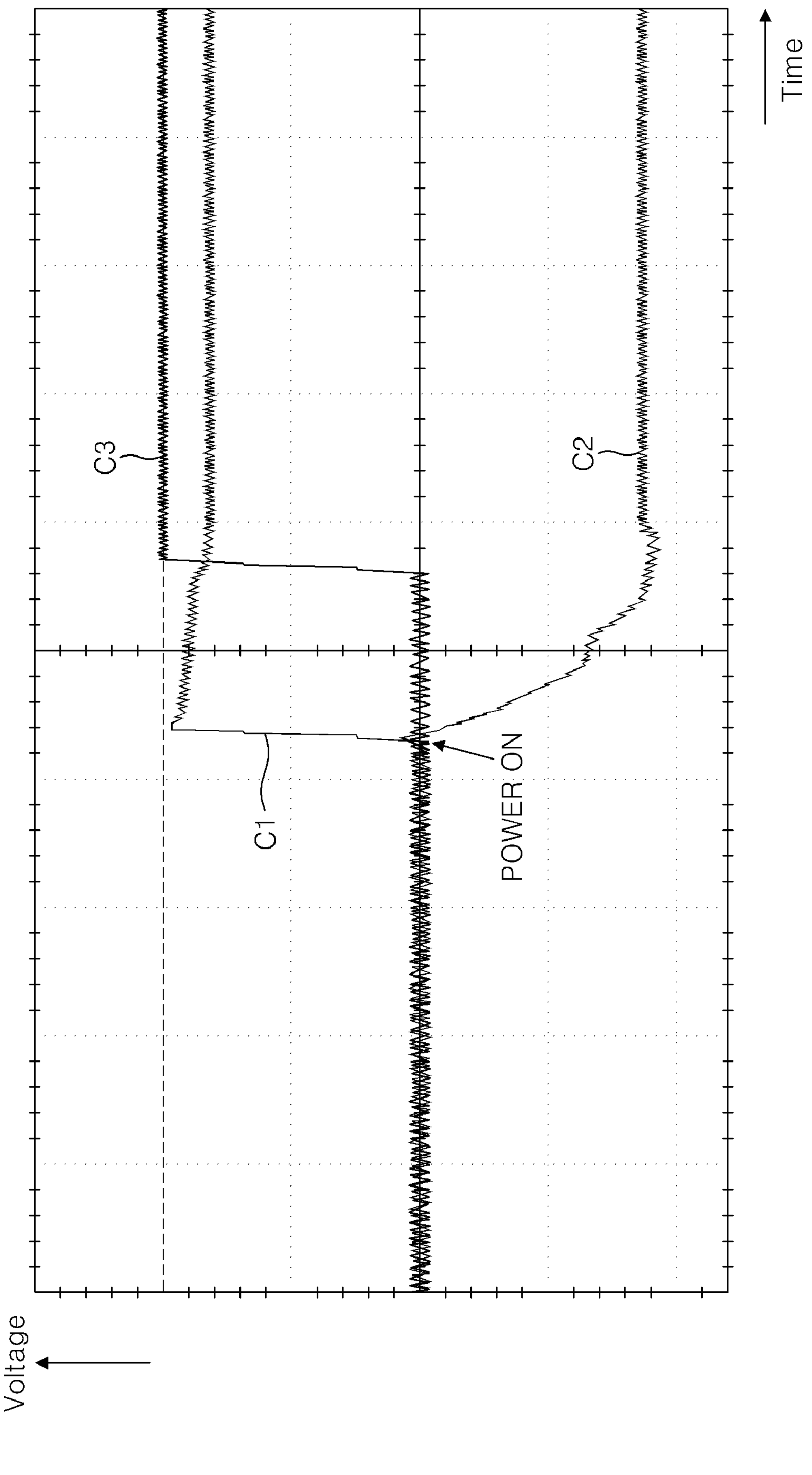
FIG. 9A is a graph of voltage versus time illustrating a power on sequence of LCD device according to the exemplary embodiments of the present invention in FIGS. 1 and 6.
Figure 9B:
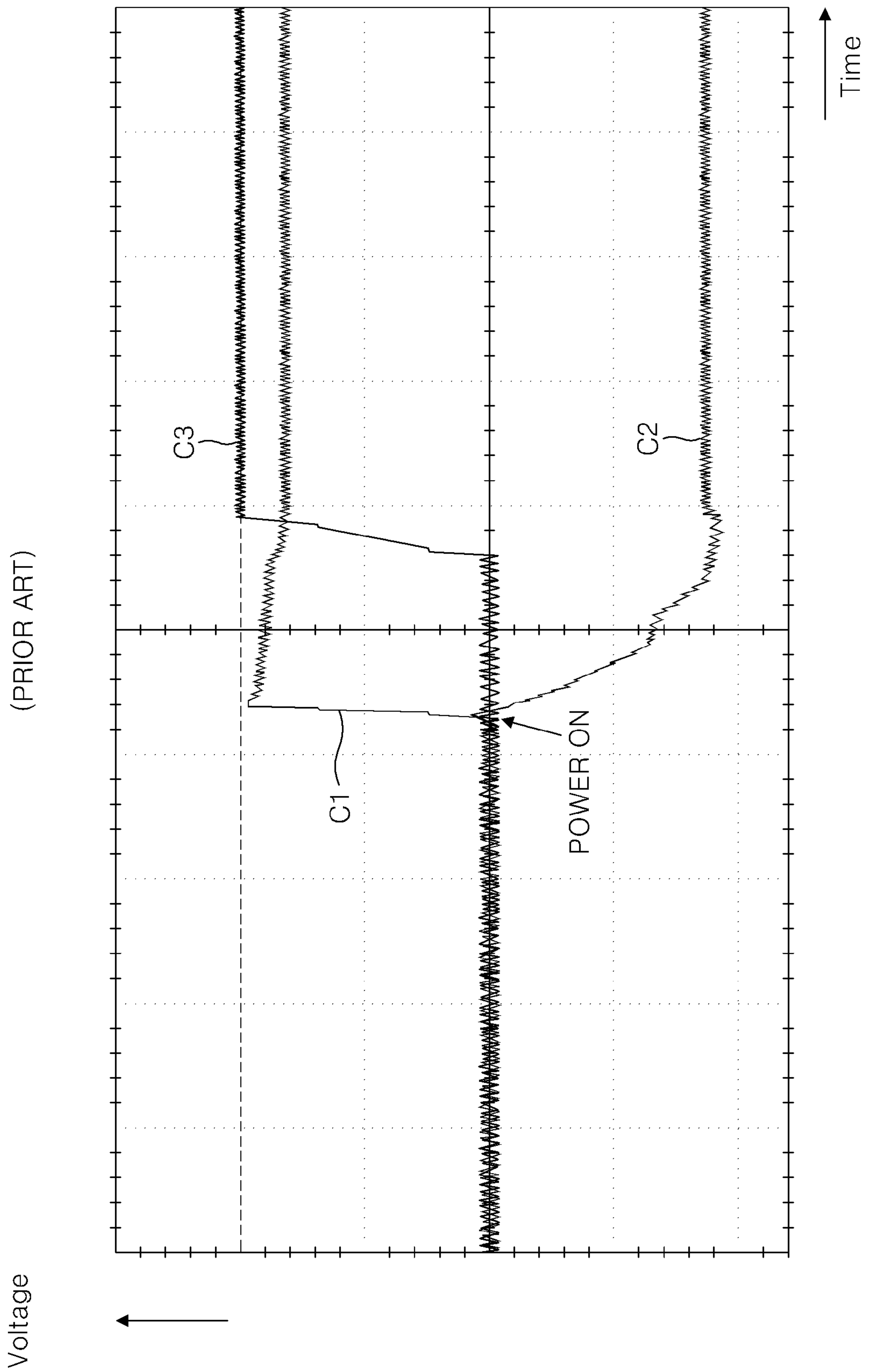
FIG. 9B (PRIOR ART)
FIG. 9B is a graph of voltage versus time illustrating a power on sequence of an LCD device of the prior art.

FIG. 9A is a graph of voltage versus time illustrating a power on sequence of the LCD device according to exemplary embodiments of the present invention in FIGS. 1 and 6, and FIG. 9B is a graph of voltage versus power illustrating a power on sequence of an LCD device of the prior art. In FIGS. 9A and 9B, curve C1 represents an outside supply voltage VDD, curve C2 represents a gate-on voltage VON and curve C3 represents a gate-off voltage VOFF.

As can be seen in FIGS. 9A and 9B, when the outside supply voltage VDD is supplied to the power supply 160 (FIGS. 1 and 6), the gate-off voltage VOFF is generated and outputted and the gate-on voltage VON is subsequently generated and outputted. Therefore, it can be seen from FIGS. 9A and 9B that the LCD device according to an exemplary embodiment of the present invention does not adversely affect the power on sequence of the LCD device of the prior art.

Figure 10A:
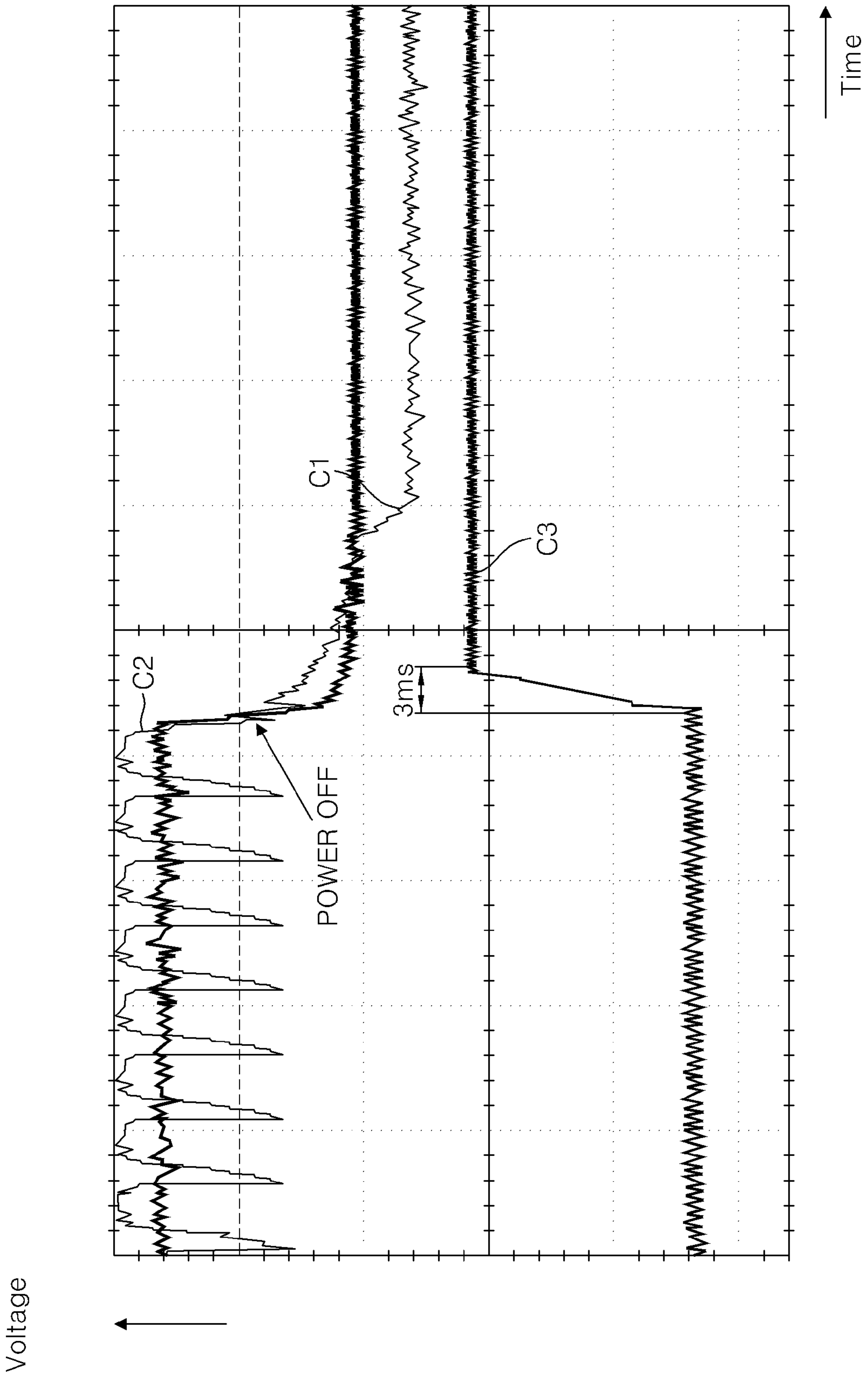
FIG. 10A is a graph illustrating a power off sequence of an LCD device according to the exemplary embodiments of the present invention in FIGS. 1 and 6.
Figure 10B:
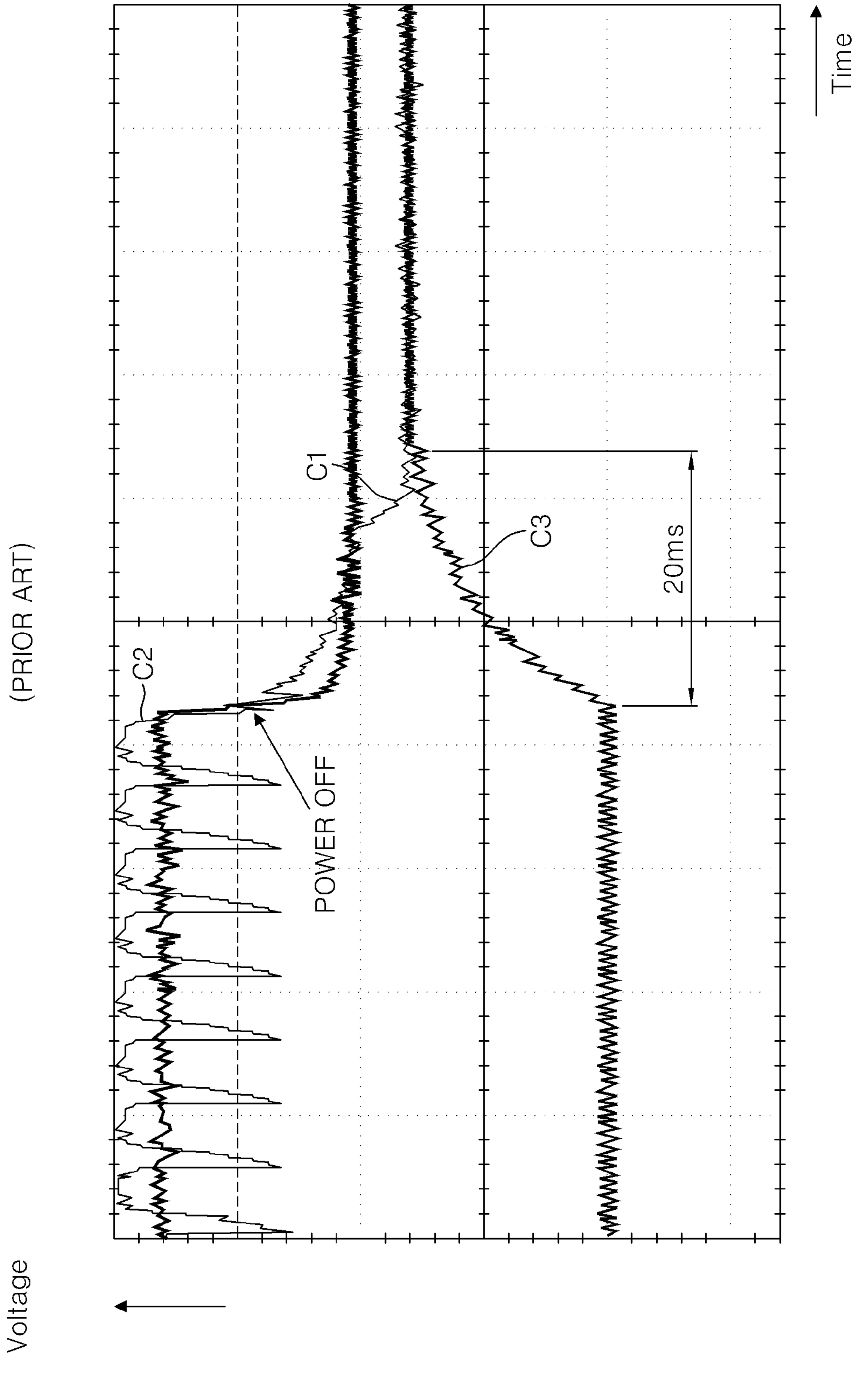
FIG. 10B (PRIOR ART)
FIG. 10B is a graph of voltage versus time illustrating a power off sequence of an LCD device of the prior art.

FIG. 10A is a graph of voltage versus time illustrating a power off sequence of the LCD device according to exemplary embodiments of the present invention shown in FIGS. 1 and 6, and FIG. 10B is a graph of voltage versus time illustrating a power off sequence of an LCD device of the prior art. In FIGS. 10A and 10B, curve C1 represents an outside supply voltage VDD, curve C2 represents a gate-on voltage VON and curve C3 represents a gate-off voltage VOFF.

As shown in FIGS. 10A and 10B, when the outside supply voltage VDD, the gate-on voltage VON and the gate-off voltage VOFF at a level of zero volts, e.g., the ground voltage, are discharged. Thus, FIGS. 10A and 10B show that the LCD device of the present invention does not adversely affect the power off sequence of the LCD device of the prior art.

However, as shown in FIGS. 10A and 10B, the gate-off voltage VOFF of the LCD device according to exemplary embodiments of the present invention shown in FIG. 10A is discharged faster than the gate-off voltage VOFF of the LCD device of the prior art shown in FIG. 10B. Specifically, according to the test results shown in FIGS. 10A and 10B, it takes about 20 ms to discharge the gate-off voltage VOFF to zero volts in the LCD device of the prior art, whereas in contrast, it takes about 3 ms to discharge the gate-off voltage VOFF to zero volts in the LCD device according to exemplary embodiments of the present invention, for the reasons described in greater detail above with respect to the exemplary embodiments of the present invention in FIGS. 1 through 5.

According to exemplary embodiments of the present invention as described above, an LCD device has a structure in which a gate-on voltage is provided at a constant level to a gate of a TFT of a liquid crystal panel according to a change in a threshold voltage of the TFT, thereby providing an advantage in which a discharge time is significantly reduced when the LCD device is powered off.

In yet another exemplary embodiment of the present invention, a method of reducing a discharge time of a liquid crystal capacitor of an LCD device is provided. The method includes outputting a supply voltage at a first level when an outside power is supplied to a power supply unit and outputting the supply voltage at a second level when the outside power is removed from the power supply unit, charging a charging voltage when the supply voltage at the first level is input to a discharge unit and outputting the charged charging voltage as a discharge signal when the supply voltage at the second level is input to the discharge unit, connecting a plurality of liquid crystal capacitors of the liquid crystal display device to a plurality of thin film transistors of the liquid crystal display device, charging the plurality of liquid crystal capacitors of the liquid crystal display device to a gradation display voltage, and turning the plurality of thin film transistors of the liquid crystal display device on to discharge the gradation display voltage charged in the plurality of liquid crystal capacitors of the liquid crystal display device when the discharge signal is provided to a gate discharge line of the liquid crystal display device.

In the method, the first level of the supply voltage may be a level of an analog supply voltage used to generate the gradation display voltage and the second level of the supply voltage is a ground voltage, but is not limited thereto in alternative exemplary embodiments. For example, the first level of the supply voltage may be a level of a gate-on voltage applied to a plurality of gate lines of the liquid crystal display device, but is not limited thereto.

The present invention should not be construed as being limited to the exemplary embodiments set forth herein. Rather, these exemplary embodiments are provided so that this disclosure will be thorough and complete and will fully convey the concept of the present invention to those skilled in the art.

Although the present invention has been particularly shown and described with reference to exemplary embodiments thereof, it will be understood by those of ordinary skill in the art that various changes in form and details may be made to the present invention without departing from the spirit or scope of the present invention as defined in the following claims, and their equivalents.

What is claimed is:

1. A liquid crystal display device comprising:

a power supply unit which outputs a supply voltage at a first level when an outside power is supplied to the power supply unit and the power supply unit outputs the supply voltage at a second level when the outside power is removed from the power supply unit;

a discharge unit which charges a charging voltage when the supply voltage at the first level is input to the discharge unit and outputs the charged charging voltage as a discharge signal when the supply voltage at the second level is input to the discharge unit; and a liquid crystal panel comprising:

a gate discharge line;

a plurality of gate lines connected to the gate discharge line;

a plurality of thin film transistors connected to the plurality of gate lines; and a plurality of liquid crystal capacitors connected to the plurality of thin film transistors and which charges to a gradation display voltage, wherein the plurality of thin film transistors is turned on to discharge the gradation display voltage charged in the plurality of liquid crystal capacitors when the discharge signal is provided to the gate discharge line.

2. The liquid crystal display device of claim 1, wherein the first level of the supply voltage is a level of an analog supply voltage used to generate the gradation display voltage, and the second level of the supply voltage is a ground voltage.

3. The liquid crystal display device of claim 2, wherein the discharge unit comprises:

a first node and a second node;

a first diode having an anode which receives the analog supply voltage used to generate the gradation display voltage and a cathode connected to the first node;

a second diode having an anode connected to the first node and a cathode connected to the second node;

a resistor having a first end connected to the first node and a second end connected to a ground terminal;

a capacitor having a first end connected to the second node and a second end connected to the ground terminal; and a switching transistor having a control terminal connected to the first node, an input terminal connected to the second node and an output terminal connected to the gate discharge line of the liquid crystal panel.

4. The liquid crystal display device of claim 3, wherein the switching transistor is a PNP-type transistor.

5. The liquid crystal display device of claim 1, wherein the gate discharge line comprises:

a plurality of first diodes each having a cathode connected to a respective gate line of the plurality of gate lines and an anode connected to the gate discharge line; and a plurality of second diodes each having a cathode connected to the gate discharge line and an anode connected to a respective gate line of the plurality of gate lines.

6. The liquid crystal display device of claim 1, wherein the gate discharge line comprises a plurality of diodes each having an anode connected to a respective gate line of the plurality of gate lines and a cathode connected to the gate discharge line.

7. A liquid crystal display device comprising:

a power supply unit which outputs an analog supply voltage at a first level when an outside power is supplied to the power supply unit and outputs the analog supply voltage at a second level when the outside power is removed from the power supply unit;

a gamma voltage generating unit which divides the analog supply voltage at the first level to generate a gamma voltage;

a data driving unit which generates a gradation display voltage using the gamma voltage;

a discharge unit which charges a charging voltage when the analog supply voltage at the first level is input to the discharge unit and outputs the charged charging voltage as a discharge signal when the analog supply voltage at the second level is input to the discharge unit; and a liquid crystal panel comprising:

a gate discharge line;

a plurality of gate lines connected to the gate discharge line;

a plurality of thin film transistors connected to the plurality of gate lines; and a plurality of liquid crystal capacitors connected to the thin film transistors and which charges to the gradation display voltage.

8. The liquid crystal display device of claim 7, wherein the discharge unit comprises:

a first node and a second node;

a first diode having an anode which receives the analog supply voltage and a cathode connected to the first node;

a second diode having an anode connected to the first node and a cathode connected to the second node;

a resistor having a first end connected to the first node and a second end connected to a ground terminal;

a capacitor having a first end connected to the second node and a second end connected to the ground terminal; and a switching transistor having a control terminal connected to the first node, an input terminal connected to the second node and an output terminal connected to the gate discharge line of the liquid crystal panel.

9. The liquid crystal display device of claim 8, wherein the switching transistor is a PNP-type transistor.

10. A method of reducing a discharge time of a liquid crystal capacitor of a liquid crystal display device, the method comprising:

outputting a supply voltage at a first level when an outside power is supplied to a power supply unit and outputting the supply voltage at a second level when the outside power is removed from the power supply unit;

charging a charging voltage when the supply voltage at the first level is input to a discharge unit and outputting the charged charging voltage as a discharge signal when the supply voltage at the second level is input to the discharge unit;

connecting a plurality of liquid crystal capacitors of the liquid crystal display device to a plurality of thin film transistors of the liquid crystal display device;

charging the plurality of liquid crystal capacitors of the liquid crystal display device to a gradation display voltage; and turning the plurality of thin film transistors of the liquid crystal display device on to discharge the gradation display voltage charged in the plurality of liquid crystal capacitors of the liquid crystal display device when the discharge signal is provided to a gate discharge line of the liquid crystal display device.

11. The method of claim 10, wherein:

the first level of the supply voltage is a level of an analog supply voltage used to generate the gradation display voltage, and the second level of the supply voltage is a ground voltage.

* * * * *